United States Patent
Flaum et al.

(10) Patent No.: US 10,960,862 B2
(45) Date of Patent: Mar. 30, 2021

(54) METHOD AND BRAKING SYSTEM FOR ELECTRONICALLY SETTING THE BRAKE FORCE DISTRIBUTION AND MOTOR VEHICLE HAVING SUCH A BRAKING SYSTEM

(71) Applicant: WABCO GmbH, Hannover (DE)

(72) Inventors: Nikolai Flaum, Hannover (DE); Torsten Wallbaum, Duingen (DE)

(73) Assignee: WABCO GMBH, Hannover (DE)

( * ) Notice: Subject to any disclaimer, the term of this patent is extended or adjusted under 35 U.S.C. 154(b) by 0 days.

(21) Appl. No.: 16/619,958

(22) PCT Filed: Apr. 24, 2018

(86) PCT No.: PCT/EP2018/060400
§ 371 (c)(1),
(2) Date: Dec. 6, 2019

(87) PCT Pub. No.: WO2018/224216
PCT Pub. Date: Dec. 13, 2018

(65) Prior Publication Data
US 2020/0094799 A1    Mar. 26, 2020

(30) Foreign Application Priority Data
Jun. 9, 2017   (DE) ...................... 10 2017 005 501.7

(51) Int. Cl.
*B60T 8/17* (2006.01)
*B60T 8/26* (2006.01)

(52) U.S. Cl.
CPC .................. *B60T 8/26* (2013.01); *B60T 8/17* (2013.01); *B60T 8/268* (2013.01)

(58) Field of Classification Search
CPC .......... B60T 8/176; B60T 8/1766; B60T 8/26; B60T 8/268
See application file for complete search history.

(56) References Cited

U.S. PATENT DOCUMENTS

| 5,011,236 A | 4/1991 | Toepfer |
| 9,327,695 B2 | 5/2016 | Lauser |
| 9,573,473 B2 * | 2/2017 | Akiyama .................. B60L 7/18 |
| 2007/0193802 A1 | 8/2007 | Hu |

(Continued)

FOREIGN PATENT DOCUMENTS

| DE | 3829951 A1 | 3/1990 |
| DE | 102006045317 A1 | 5/2007 |

(Continued)

*Primary Examiner* — Anshul Sood
(74) *Attorney, Agent, or Firm* — Leydig, Voit & Mayer, Ltd.

(57) ABSTRACT

A method for electronically setting the brake force distribution of a desired total braking force in partial braking forces to the axle of a motor vehicle in dependence on the differential slip is provided. The differential slip is detected as the difference of the slip values of a variable representing the slip at the respective axle and is assigned to a relevant pair of axles. One of the axles is selected as a reference axle and the respective differential slip of a pair of axles is determined as the difference of the slip value at the reference axle and of the respective slip value of one of the further axles.

9 Claims, 3 Drawing Sheets

(56) References Cited

U.S. PATENT DOCUMENTS

| | | | |
|---|---|---|---|
| 2009/0134698 A1* | 5/2009 | Herges | B60T 8/1766 |
| | | | 303/113.2 |
| 2011/0118935 A1* | 5/2011 | Shiozawa | B60T 8/172 |
| | | | 701/33.4 |
| 2018/0265077 A1* | 9/2018 | Watanabe | B60W 10/188 |
| 2019/0054907 A1 | 2/2019 | Skrabak | |

FOREIGN PATENT DOCUMENTS

| | | |
|---|---|---|
| DE | 102011118130 A1 | 5/2013 |
| DE | 102015115852 A1 | 3/2017 |

* cited by examiner

METHOD AND BRAKING SYSTEM FOR ELECTRONICALLY SETTING THE BRAKE FORCE DISTRIBUTION AND MOTOR VEHICLE HAVING SUCH A BRAKING SYSTEM

CROSS-REFERENCE TO PRIOR APPLICATIONS

This application is a U.S. National Stage Application under 35 U.S.C. § 371 of International Application No. PCT/EP2018/060400 filed on Apr. 24, 2018, and claims priority to German Patent Application No. DE 10 2017 005 501.7 filed on Jun. 9, 2017. The International Application was published in German on Dec. 13, 2018 as WO 2018/224216 A1 under PCT Article 21(2). The International Application and Publication are hereby incorporated by reference herein.

FIELD

The present invention relates to electronic braking including, for example, electronically setting the distribution of a desired total braking force and partial braking forces for axles of a motor vehicle.

BACKGROUND

DE 38 29 951 A1 discloses a method for carrying out a load-dependent regulation of the braking pressure on a commercial vehicle, which utilizes the components of a present antilocking system in order thus to realize an automatic load-dependent braking function (ALB). In the known methods, the braking pressure and thus the brake force distribution is intended to be regulated axle-specifically below the locking limit, wherein an inter-axle braking pressure distribution is automatically regulated, in accordance with the evaluation of the wheel rotational speed signals delivered by the rotational speed sensors, in a slip range which lies below the range in which the antilocking function comes effective.

DE 10 2006 045 317 A1 discloses an electronic brake force distribution in which the braking forces are distributed to the vehicle axles in dependence on the vehicle deceleration instead of in dependence on the differential slip. DE 10 2011 118 130 B4 discloses an automatic regulation of the brake force distribution for commercial vehicles, in which the setting of the distribution of a desired total braking force in partial braking forces to the axles of the commercial vehicle occurs in dependence on the differential slip or a differential speed.

SUMMARY

In an embodiment, the present invention provides a method for electronically setting the brake force distribution of a desired total braking force in partial braking forces to the axle of a motor vehicle in dependence on the differential slip. The differential slip is detected as the difference of the slip values of a variable representing the slip at the respective axle and is assigned to a relevant pair of axles. One of the axles is selected as a reference axle and the respective differential slip of a pair of axles is determined as the difference of the slip value at the reference axle and of the respective slip value of one of the further axles. A threshold value is prescribed for the differential slip and, in the presence of differential slip below the prescribed threshold value:

In a first theorem, the desired total braking force of the motor vehicle is assumed as the sum of the partial braking forces of the axles considered in the brake force distribution and a slip-force ratio is prescribed or established for the axles.

In a second theorem, the differential slip is assumed as the difference of the respective products of a slip-force ratio and of the partial braking force at the respective axle considered in the brake force distribution, and at least one desired differential slip determined in advance is prescribed as differential slip for the respective pairs of axles.

From a linking of the first theorem with the second theorem, with consideration of the slip-force ratios of the axles and of the prescribed desired differential slip, the partial braking force at the reference axle is established and set.

BRIEF DESCRIPTION OF THE DRAWINGS

Embodiments of the present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The electronic brake force distribution (EBD) is a system for stabilizing motor vehicles. By contrast to conventional braking systems having an antilocking system (ABS), the electronic brake force distribution distributes the braking force to be provided overall by setting braking pressures between the axles of the vehicle and thus stabilizes the motor vehicle. The electronic brake force distribution allows the brakes of a motor vehicle to be designed in a manner appropriate to the requirements. In the case of monitored stability behavior of the motor vehicle, the rear axles can be used more strongly for the overall deceleration of the motor vehicle.

In the electronic brake force distribution, an electronic control device continuously calculates the slip differences at the front and rear wheels. if in a braking operation the slip ratio exceeds a prescribed stability limit value, the closing of ABS pressure inlet valves prevents a further increase of the braking pressure at the critical axle and/or increases the braking force at other axles. In the case of an increasing braking requirement, for example if the driver raises the brake pedal force and thus the braking requirement, the slip at the front wheels also generally increases. The ratio of the slip values at the wheels of the front axle and of the critical axle in question becomes smaller again and the pressure inlet valve is now opened again, with the result that the braking pressure at the wheels of the relevant axle can increase again.

n the brake force distribution by regulating the braking pressure, the braking force at the critical axle is reduced and, where appropriate, the braking forces at all other axles are increased in order to obtain optimum brake force distribution according to the specifications of the regulation. After each regulating intervention, the system waits and checks whether the correction was successful, that is to say the current state corresponds to the specifications. If necessary, further adaptations are performed, that is to say further regulating interventions follow. Here, the brake force distribution occurs in a plurality of small adaptation steps. Particularly in the case of commercial vehicles having a plurality of axles, the brake force distribution becomes more complicated with an increasing number of axles, with the result that the setting of the brake force distribution is often associated with very many small regulating interventions. The readjustment often has a turbulent action and is perceived as unpleasant. Furthermore, a correspondingly large supply of compressed air has to be provided for carrying out the adaptation measures by means of pressure increase and venting for the purpose of pressure reduction.

An object on which the invention is based is to reduce the complexity in the continuous setting of the brake force distribution in motor vehicles having an arbitrary number of axles.

According to an embodiment of the invention, one of the axles is selected as a reference axle and the respective differential slip of a pair of axles is determined as the difference of the slip value at the reference axle and of the respective slip value of one of the further axles. In the presence of differential slip between the axles below a predetermined threshold value, a partial braking force for the selective reference axle is established and set. This reference axle is one of the axles of the motor vehicle and each pair of axles which is considered for determining the partial braking force of the reference axle is formed with the reference axle as a pair component. For the setting, according to an embodiment of the invention, of the distribution of the total braking force to the axles, the respective differential slip between the selected reference axle and one of the remaining axles of the motor vehicle is thus established and evaluated. In other words, the partial braking force is set for a certain reference axle common to all pairs of axles, wherein differential slip for respective pairs of axles is considered with respect to the reference axle and taken into consideration in establishing the partial braking force, in particular with respect to the front axle of the motor vehicle as reference axle.

With prescribed or established slip-force ratios for the axles and also desired differential slip, determined in advance, for each pair of axles, an optimized partial braking force for the reference axle can be established, and this in an arbitrary number of further axles of the vehicle. An embodiment of the invention makes it possible with these specifications to determine the partial braking force at the reference axle below the prescribed threshold value under advantageous conditions of the prescribed values. In this embodiment, the invention has recognized that the ratio between the braking force and the slip at an axle extends substantially linearly in the stable region of the μ-slip curve. Below the prescribed threshold value, which is prescribed such that the stable region of the μ-slip curve is not left, a characteristic slip-force ratio is present for the respective axle. This is continuously established or established in advance and prescribed.

With a determined desired differential slip for each pair of axles, it is thus possible, in the case of differential slips below the prescribed threshold value, for the partial braking force at the reference axle to be established. The desired differential slip for each respective pair of axles is prescribed according to prescribed optimization requirements, for example with view to a wear which is as low as possible. The partial braking forces corresponding to the specifications then result in the desired wear optimization. At the same time, the maximum permissible values for the differential slip are not exceeded.

An embodiment of a method according to the invention with consideration of a prescribed and hence prognosticated desired differential slip and slip-force ratios for the axles is provided only below a prescribed threshold value for the differential slip. If the differential slip exceeds this threshold value, there occur stability interventions, with, for example, an antilocking system setting the braking pressures.

To determine the partial braking force at the reference axle, in a first theorem the desired total braking force of the motor vehicle is assumed as the sum of the partial braking forces of the axles considered in the brake force distribution. The follow equation thus results for the first theorem:

$$F_{Total} = F_1 + F_2 + F_3 \quad \text{(formula 1)}$$

where
$F_{Total}$ denotes total braking force
$F_1$ denotes partial braking force at reference axle
$F_2$ denotes partial braking force at second axle
$F_3$ denotes partial braking force at third axle
$F_n$ denotes braking force at n-th axle.

In a second theorem, the differential slip is assumed as the difference of the respective products of a slip-force ratio and of the partial braking force at the respective axle considered in the brake force distribution. The second theorem thus corresponds to the following equation:

$$\lambda_{1n} = \left(\frac{\delta\lambda}{\delta F}\right)_n * F_n - \left(\frac{\delta\lambda}{\delta F}\right)_1 * F_1 \quad \text{(formula 2)}$$

$\lambda_{1n}$ denotes differential slip $\left(\frac{\delta\lambda}{\delta F}\right)_1$ denotes slip-force ratio at reference axle $\left(\frac{\delta\lambda}{\delta F}\right)_n$ denotes slip-force ratio at $n$-$th$ axle.

Reformulating this equation gives the following equation for the partial braking force at the n-th axle:

$$F_n = \frac{\left(\frac{\delta\lambda}{\delta F}\right)_1 * F_1 + \lambda_{1n}}{\left(\frac{\delta\lambda}{\delta F}\right)_n} \quad \text{(formula 3)}$$

By virtue of the linking according to an embodiment of the invention of the first theorem with the second theorem with consideration of the slip-force ratios of the axles and of the prescribed desired differential slip, the partial braking force at the reference axle can be precisely determined corresponding to these optimal specifications. The following equation results for the determination of the partial braking force at the reference axle:

$$F_1 = \frac{F_{Total} - \left(\frac{\lambda_{12}}{\left(\frac{\delta\lambda}{\delta F}\right)_2}\right) - \left(\frac{\lambda_{13}}{\left(\frac{\delta\lambda}{\delta F}\right)_3}\right) - \left(\frac{\lambda_{1n}}{\left(\frac{\delta\lambda}{\delta F}\right)_n}\right)}{1 + \frac{\left(\frac{\delta\lambda}{\delta F}\right)_1}{\left(\frac{\delta\lambda}{\delta F}\right)_2} + \frac{\left(\frac{\delta\lambda}{\delta F}\right)_1}{\left(\frac{\delta\lambda}{\delta F}\right)_3} + \frac{\left(\frac{\delta\lambda}{\delta F}\right)_1}{\left(\frac{\delta\lambda}{\delta F}\right)_n}} \quad \text{(formula 4)}$$

The braking operation with a prescribed desired differential slip and individual slip-force ratios for the axles results, in the case of differential slips below the threshold hold prescribed according to an embodiment of the invention, in the number of adjustment measures required for setting the brake force distribution being drastically reduced. In this way, the air consumption of the braking system is reduced and moreover ensures smooth and thus stable braking.

In an advantageous embodiment of the invention, the partial braking forces of the further axles are determined with consideration of the already established partial braking force for the reference axle according to the second theorem or the reformulation of the second theorem that is indicated above as formula 3. Here, it is possible to establish, for an arbitrary number of axles, partial braking forces of the respective axles with optimized distribution of the total braking force.

The slip-force ratios for the determination according to an embodiment of the invention of the partial braking force for the reference axle are preferably prescribed corresponding to the gradient in the stable region of the respective static friction coefficient-slip curves (µ-slip curves) of the wheels at the respective axles. The gradient of the static friction coefficient/slip curve is approximately constant in the stable region, with the result that the value of the gradient represents the characteristic of the respective wheel braking and can be used in a particularly suitable manner for the purposes of the determination according to an embodiment of the invention of the partial braking force at the reference axle.

Reliability of the calculation of the partial braking forces within the context of the brake force distribution is provided with specification of the threshold values of the differential slip below 10%. The brake force distribution advantageously occurs in a calculation on the basis of the desired differential slip, which is established in advance or, in other words, estimated, for each pair of axles below a threshold value of approximately 5%, with the result that a corresponding threshold value of 5% is prescribed. Since for most tires the maximum of the µ-slip curves in the case of a slip is around approximately 10%, the specification of the threshold value of 5% ensures that the slip-force ratios for the axles that are established in advance and prescribed in the calculation are realistically estimated and therefore the brake force distribution is decisively determined from the prescribed desired differential slip. This desired differential slip is optimized in advance for example with a view to wear which is as low as possible.

In each case according to an embodiment, a desired differential slip for each pair of axles is advantageously established or prescribed, wherein the position of the respective axle in the sequence of the axles of the vehicle is taken into consideration.

Establishing the partial braking forces is simplified if the reference axle used is the axle of the vehicle that is situated in the front in the direction of travel, that is to say the vehicle front axle.

In a braking system for electronically setting the brake force distribution with consideration of slip-force ratios for the axles which can be determined in advance and a desired differential slip for all pairs of axles which is determined in advance, a brake control unit is assigned sensors for the axle-by-axle detection of information for determining slip values of a variable representing the slip at the respective axle. Use is preferably made for this purpose of the rotational speed sensors of the respective wheels which are present for present electronic braking systems or at least for an antilocking system. The slip value of the respective wheel is established from the information of the rotational speed sensors. The slip values of two wheels of the same axle can be averaged to determine the differential slip of two axles. As an alternative to using the slip of the respective axle, the speed or the differential speed can be used from the information of the rotational speed sensors.

Figure 1:
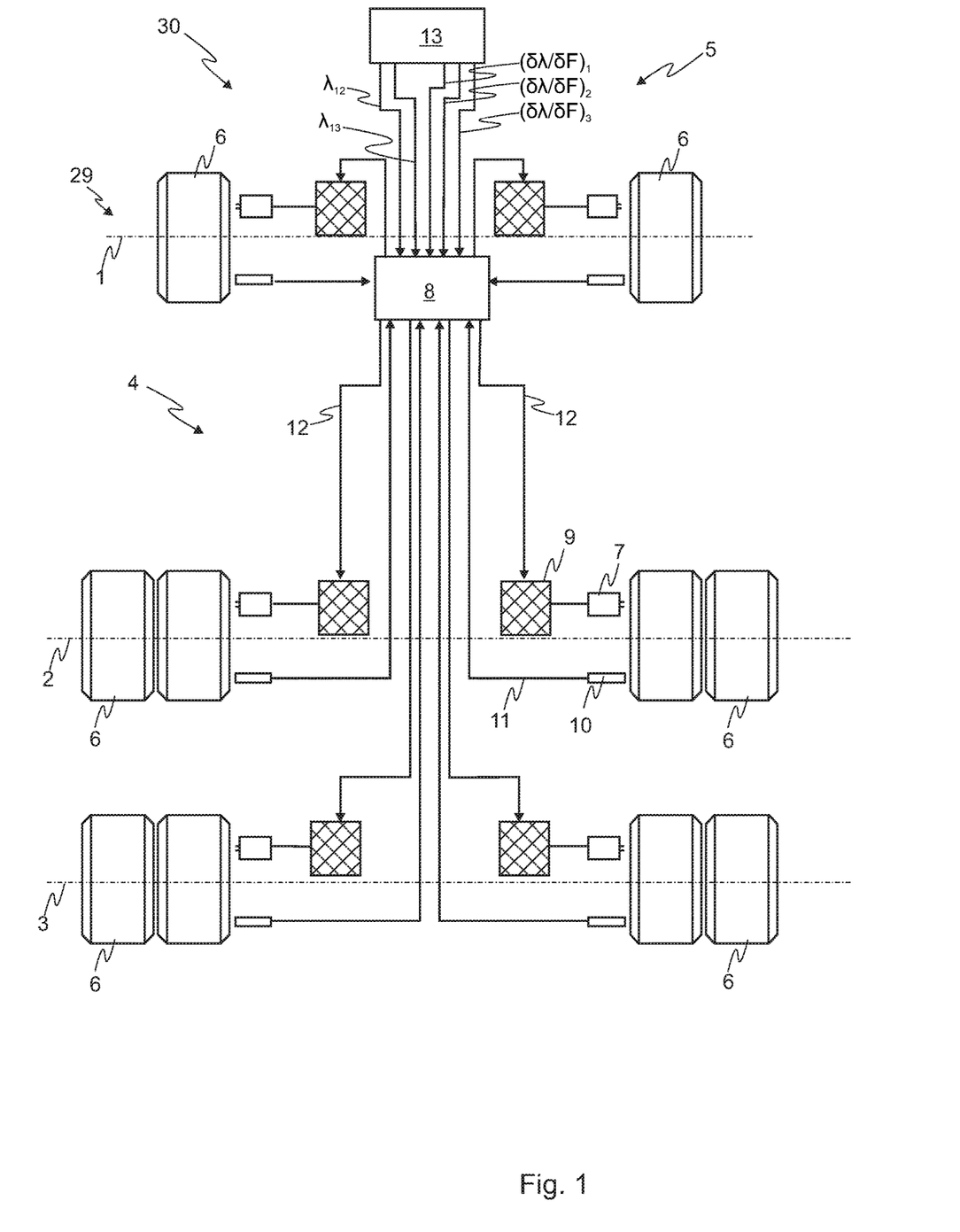
FIG. 1 shows a schematically illustrated exemplary embodiment of a braking system of a commercial vehicle.

FIG. 1 shows an electric-pneumatic plan of the braking system 4 of a motor vehicle 5, namely of a commercial vehicle 30. In the exemplary embodiment, the motor vehicle has three axles 1, 2, 3, namely an axle 1 situated to the front in the forward direction (front axle), a second axle 2 and a third axle 3. Each axle 1, 2, 3 respectively has two wheels 6 which are arranged on both sides of the motor vehicle 5. Each wheel 6 is respectively assigned a pneumatically actuatable wheel brake 7. The wheel brakes 7 each generate, under the action of braking pressure, partial braking forces $F_1$, $F_2$, $F_3$ (FIG. 2) on the respective axle 1, 2, 3.

The setting of the braking pressure and thus of the braking forces is monitored by an electronic brake control unit 8. Each wheel 6 is assigned a pressure control valve 9 which can be individually activated by the brake control unit 8. It is possible by means of a corresponding activation of the respective pressure control valve 9 for the brake control unit 8 to individually regulate the braking pressure at each wheel 6 of the motor vehicle 5 and thus the braking force of the respective axle.

The brake control unit 8 and the pressure control valves 9 are key elements of an antilocking system (ABS) or of an electronic braking system (EBS), which also includes rotational speed sensors 10 at the respective wheels 6. Each rotational speed sensor 10 is electrically connected to the brake control unit 8 and continuously signals the rotational speed measurement values 11 detected by it to the brake control unit 8. The brake control unit 8 establishes the slip $\lambda_1$, $\lambda_2$, $\lambda_3$ of the respective axles 1, 2, 3 via the rotational speed measurement values 11. Here, the results of the individual wheels 6 of the respectively identical axles can be averaged to a result which represents the respective axle 1, 2, 3, that is to say the slip $\lambda_1$, $\lambda_2$, $\lambda_3$ (FIG. 2) for the respective axle 1, 2, 3.

In order to set a defined braking force, the brake control unit 8 generates electrical actuating signals 12 for the respective pressure control valves 9. Here, depending on the requirement, the braking pressure at each wheel brake 7 can be increased, maintained or lowered as required in order in this way to generate a defined braking force at the respective wheels 6. The brake control unit 8 is designed to set the braking forces in dependence on differential slips. Accordingly, differential slips $\delta\lambda 2$, $\delta\lambda 3$ are established from the slip values $\lambda_1$, $\lambda_2$, $\lambda_3$ for the individual axles and assigned to a relevant pair 15, 16 of axles 1, 2, 3. Here, the differential slip $\delta\lambda 2$ refers to the slip difference between the front axle 1 and the second axle 2, and the differential slip δλ3 refers to the slip difference between the front axle 1 and the third axle 3.

Figure 2:
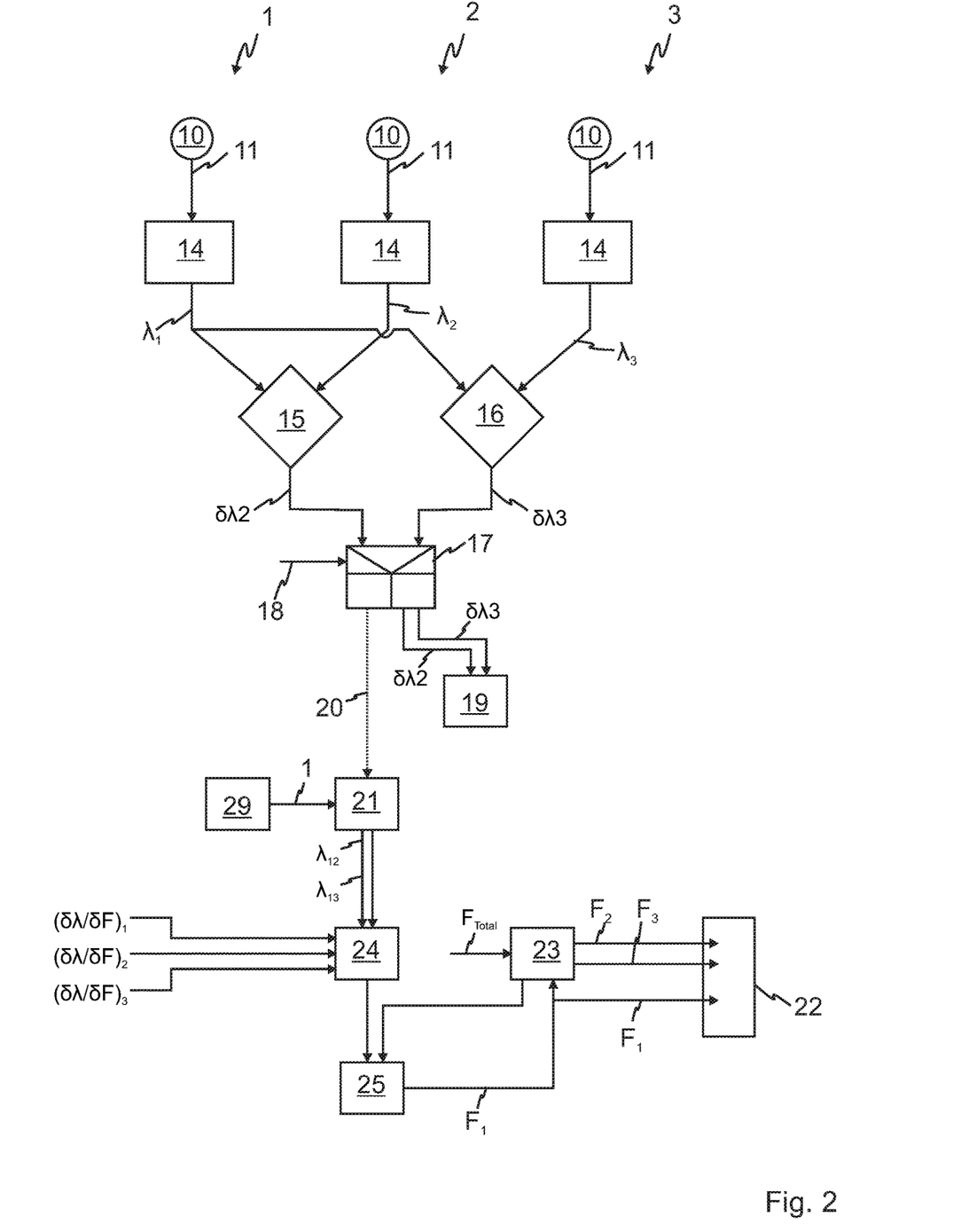
FIG. 2 shows a flowchart of an exemplary embodiment of a method for electronically setting the brake force distribution.

The brake control unit 8 also sets, via the pressure control valves 9, the distribution of a desired total braking force in partial braking forces to the axles 1, 2, 3 of the motor vehicle 5 (brake force distribution 22 in FIG. 2). For this purpose, specified values are held in a memory element 13 for the brake control unit 8, namely in each case a slip-force ratio for the axles of the motor vehicle 5, that is to say, in the exemplary embodiment of a motor vehicle 5 having three axles, correspondingly three slip-force ratios $(\delta\lambda/\delta F)_1$, $(\delta\lambda/\delta F)_2$, $(\delta\lambda/\delta F)_3$. Moreover, values determined in advance for the desired differential slip $\lambda_{12}$, $\lambda_{13}$ are held in the memory element 13. The electronic setting of the distribution of a desired total braking force in partial braking forces to the axles 1, 2, 3 of the motor vehicle 5 is explained in more detail below with reference to FIG. 2.

In the exemplary embodiment illustrated in FIG. 2 of the electronic setting of the brake force distribution, it is the case that, for each axle 1, 2, 3, the rotational speed measurement values 11 of the rotational speed sensors 10 are fed for evaluation 14 in order to calculate a slip. Accordingly, a slip value $\lambda_1$, is established for the axle 1, a slip value $\lambda_2$ is established for the second axle 2 and slip value $\lambda_3$ is established for the third axle 3.

In order to establish a partial braking force, one of the axles 1, 2, 3 is selected as the reference axle 29 and the respective differential slip δλ2, δλ3 of a pair 15, 16 of axles 1, 2, 3 is determined as the difference of the slip value $\lambda_1$ at the reference axle 29 and of the respective slip value $\lambda_2$, $\lambda_3$ of one of the further axles 2, 3. In the exemplary embodiment, the reference axle 29 is the axle 1 of the motor vehicle 5 situated at the front in the direction of travel, that is to say the vehicle front axle. The differential slips δλ2, δλ3 for each pair 15, 16 of axles are thus related to the axle 1 selected as the reference axle 29 for which the partial braking force $F_1$ is established. All pairs 15, 16 of axles 1, 2, 3 which are considered for establishing the distribution of the total braking force with respect to the respective differential slip δλ2, δλ3 are formed with the reference axle 29 as respective pair component.

In a comparison step 17, the continuously established differential slips δλ2, δλ3 are compared with a prescribed threshold value 18 for the differential slip δλ2, δλ3. The threshold value 18 is preferably below 10% slip, namely, in the exemplary embodiment shown, approximately 5% slip. In case of differential slips δλ2, δλ3 above the prescribed threshold value 18, a regulation 19 of the braking pressure or of the braking forces occurs in dependence on the continuously established differential slips δλ2, δλ3.

If both differential slips δλ2, δλ3 lie below the prescribed threshold value 18 for the currently established differential slips δλ2, δλ3, there occurs a switching 20 into an estimating mode 21 in which, for the setting of the brake force distribution 22 in partial braking forces $F_1$, $F_2$, $F_3$, the desired differential slip $\lambda_{12}$, $\lambda_{13}$ established in advance is prescribed for each pair of axles 15, 16, and slip-force ratios $(\delta\lambda/\delta F)_1$, $(\delta\lambda/\delta F)_2$, $(\delta\lambda/\delta F)_3$ are prescribed for the axles 1, 2, 3.

Figure 3:
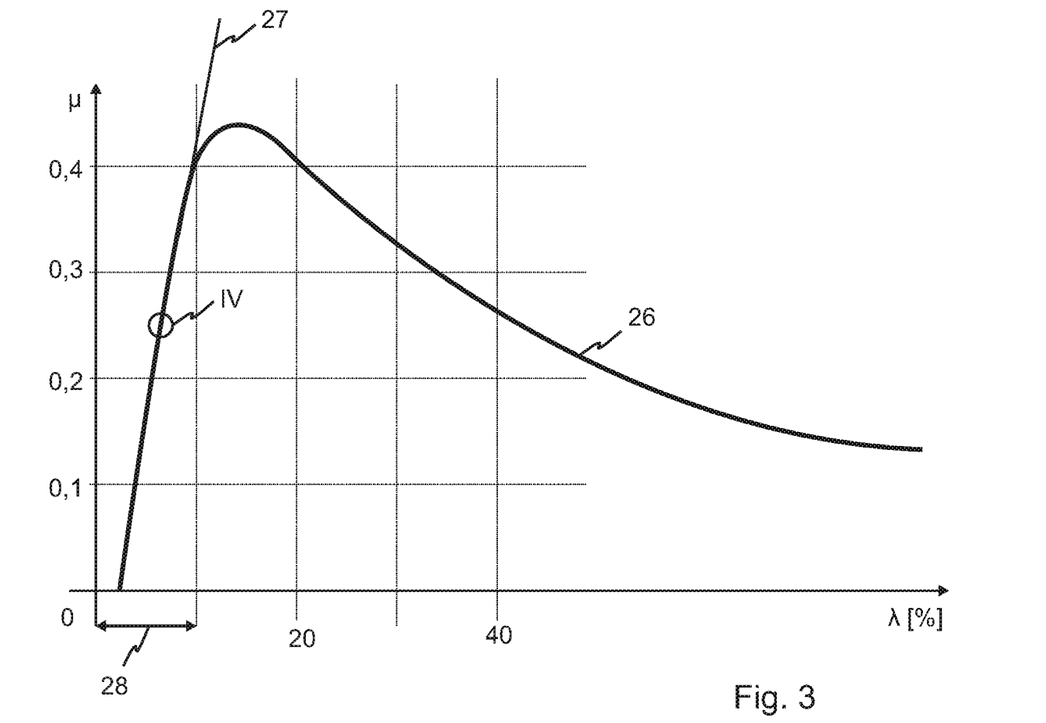
FIG. 3 shows a representative profile of a µ-slip curve.
Figure 4:
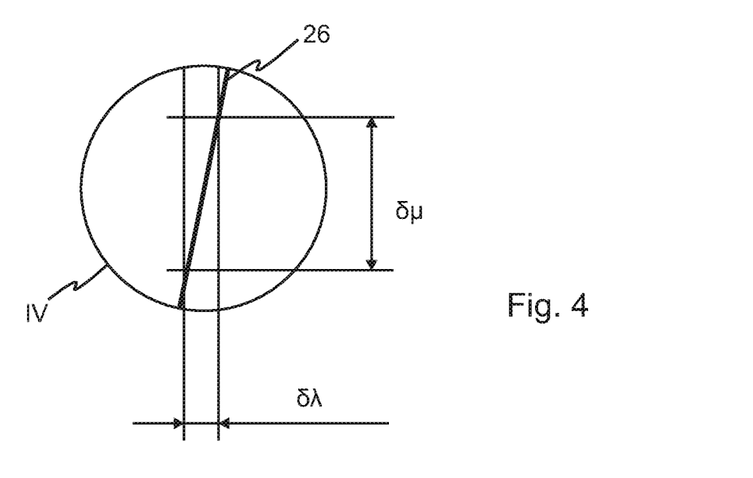
FIG. 4 shows an enlargement of the detail IV in FIG. 3.

FIG. 3 shows a schematic μ-slip curve 26 or static friction coefficient/slip curve. The slip-force ratio $(\delta\lambda/\delta F)_1$, $(\delta\lambda/\delta F)_2$, $(\delta\lambda/\delta F)_3$ corresponds qualitatively in each case to the gradient 27 in the stable branch 28 of the respective μ-slip curve 26 for the corresponding wheel. FIG. 4 illustrates, in the detail IV according to FIG. 3, the substantially linear profile in the stable branch 28 with a gradient 27. The substantially constant gradient 27 is used for the purposes of estimating the slip-force ratio and thus for the brake force distribution 22. The stable branch 28 of the μ-slip curves 26 extends to close to the maximum of the curve 26, which is approximately 10%, with the result that it is ensured with the specification of the threshold value 18 of approximately 5% that the specification of realistic slip ratios occurs.

In the brake force distribution 22, as first theorem 23 the desired total braking force $F_{Total}$ of the motor vehicle is assumed as the sum of the partial braking forces $F_1$, $F_2$, $F_3$ of the axles 1, 2, 3 considered in the brake force distribution 22. This corresponds to the following relationship:

$$F_{Total} = F_1 + F_2 + F_3$$

n a second theorem 24, the differential slip is determined as the difference of the respective products of a slip-force ratio $(\delta\lambda/\delta F)_1$, $(\delta\lambda/\delta F)_2$, $(\delta\lambda/\delta F)_3$ and of the partial braking force $F_1$, $F_2$, $F_3$ at the respective one of the three axles 1, 2, 3. This results in the following relationship for the second theorem 24:

$$\lambda_{1n} = \left(\frac{\delta\lambda}{\delta F}\right)_n * F_n - \left(\frac{\delta\lambda}{\delta F}\right)_1 * F_1$$

Reformulating this second theorem 24 results in the following equation for the partial braking force at the n-th axle:

$$F_n = \frac{\left(\frac{\delta\lambda}{\delta F}\right)_1 * F_1 + \lambda_{1n}}{\left(\frac{\delta\lambda}{\delta F}\right)_n}$$

This equation takes account of the fact that the slip-force ratios $(\delta\lambda/\delta F)_1$, $(\delta\lambda/\delta F)_2$, $(\delta\lambda/\delta F)_3$ are each determined by the gradient 27 of the respective μ-slip curve.

From a linking 25 of the first theorem 23 with the second theorem 24 with consideration of the prescribed slip-force ratios $(\delta\lambda/\delta F)_1$, $(\delta\lambda/\delta F)_2$, $(\delta\lambda/\delta F)_3$ and of the prescribed desired differential slip $\lambda_{12}$, $\lambda_{13}$, there results, for the exemplary embodiment of a motor vehicle 5 having three axles (1, 2, 3), the following relationship for establishing the partial braking force $F_1$ at the reference axle 29, that is to say the front axle designated by the reference sign 1:

$$F_1 = \frac{F_{Total} - \left(\frac{\lambda_{12}}{\left(\frac{\delta\lambda}{\delta F}\right)_2}\right) - \left(\frac{\lambda_{13}}{\left(\frac{\delta\lambda}{\delta F}\right)_3}\right)}{1 + \frac{\left(\frac{\delta\lambda}{\delta F}\right)_1}{\left(\frac{\delta\lambda}{\delta F}\right)_2} + \frac{\left(\frac{\delta\lambda}{\delta F}\right)_1}{\left(\frac{\delta\lambda}{\delta F}\right)_3}}$$

With consideration of the established partial braking force $F_1$ for the reference axle 29, that is to say the front axle 1 in the exemplary embodiment, the respective partial braking force $F_2$, $F_3$ at the further axles is determined according to the second theorem 24.

The values for the desired differential slip $\lambda_{12}$, $\lambda_{13}$ are established in advance for the respective pairs 15, 16 of axles for example under the point of view of as low a wear as possible.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1. (Front) axle
2. (Second) axle
3. (Third) axle
4. Braking system
5. Motor vehicle
6. Wheel
7. Wheel brake
8. Brake control unit
9. Pressure control valve
10. Rotational speed sensor
11. Rotational speed measurement values
12. Actuating signals
13. Memory element
14. Evaluation
15. Pair of axles
16. Pair of axles
17. Comparison step
18. Threshold value
19. Regulation
20. Switching
21. Estimating mode
22. Brake force distribution
23. First theorem
24. Second theorem
25. Linking
26. μ-Slip curve
27. Gradient
28. Stable branch
29. Reference axle
30. Commercial vehicle
$F_1$ Partial braking force at reference axle
$F_2$ Partial braking force at second axle
$F_3$ Partial braking force at third axle
$F_{Total}$ Total braking force
$\lambda_1$ Slip value at reference axle
$\lambda_2$ Slip value at second axle
$\lambda_3$ Slip value at third axle
$\delta\lambda 2$ Differential slip between second axle and reference axle
$\delta\lambda 3$ Differential slip between third axle and reference axle
$\lambda_{12}$ Desired differential slip between second axle and reference axle
$\lambda_{13}$ Desired differential slip between third axle and reference axle
$(\delta\lambda/\delta F)_1$ Slip/force ratio of reference axle
$(\delta\lambda/\delta F)_2$ Slip/force ratio of second axle
$(\delta\lambda/\delta F)_3$ Slip/force ratio of third axle

The invention claimed is:

1. A method for electronically setting a brake force distribution of a desired total braking force in partial braking forces to axles of a motor vehicle in dependence on a differential slip, the method comprising:
    selecting, from the axles of the motor vehicle, a reference axle;
    determining a respective differential slip of a respective pair of axles as a difference of a slip value at the reference axle and a slip value at a respective further axle;
    prescribing a threshold value for the differential slip; and
    in response to the differential slip being below the prescribed threshold value:
        assuming, in a first theorem, the desired total braking force of the motor vehicle as a sum of partial braking forces of the axles of the motor vehicle,
        prescribing or establishing a slip-force ratio for each of the axles of the motor vehicle,
        assuming, in a second theorem, the respective differential slip as a difference of a respective product of a slip-force ratio for the respective further axle and a partial braking force at the respective further axle,
        prescribing, as a differential slip for the respective pair of axles, at least one desired differential slip determined in advance, and
        establishing and setting, from a linking of the first theorem with the second theorem and with consideration of the slip-force ratios and of the prescribed desired differential slip, the partial braking force at the reference axle.

2. The method as claimed in claim 1, the method further comprising determining, with consideration of the established partial braking force for the reference axle, a respective partial braking force at a further axle according to the second theorem.

3. The method as claimed in claim 1, wherein the slip-force ratios are prescribed or established corresponding to a gradient in a stable branch of a respective μ-slip curves.

4. The method as claimed in claim 1, wherein the threshold value for the differential slip lies below 10%.

5. The method as claimed in claim 1, wherein in each case a desired differential slip for each pair of axles is established or prescribed.

6. The method as claimed in claim 1, wherein the reference axle is a front axle of the motor vehicle.

7. A braking system for electronically setting a brake force distribution of a desired total braking force in partial braking forces to axles of a motor vehicle in dependence on differential slips, the braking system comprising:
    at least one adjustable wheel brake for each axle of the motor vehicle;
    a brake controller; and
    sensors assigned to the brake controller for axle-by-axle detection of measurement values for determining respective slip values at the axles, wherein the brake controller is configured to:
  determine the differential slips as respective differences of respective slip values,
  to assign each respective determined differential slip to a respective pair of axles and,
  to distribute, in dependence on the determined differential slips, the desired total braking force in the partial braking forces to the axles,
wherein the brake controller is further configured to:
select one of the axles as a reference axle,
determine a respective differential slip of a respective pair of axles as a difference of a slip value at the reference axle and a respective slip value of a respective further axle, and
in response to the respective differential slip being below a prescribed threshold value of the respective differential slip, to determine and set a partial braking force at the reference axle,
wherein the partial braking force at the reference axle is determined from a linking of a first theorem with a second theorem with consideration of slip-force ratios prescribed or established for respective axles and one or more desired differential slips determined in advance and prescribed for respective pairs of axles,
wherein according to the first theorem the desired total braking force of the motor vehicle is a sum of the partial braking forces of the individual axles, and
wherein according to the second theorem the respective differential slip is assumed to be a difference of a respective product of a slip-force ratio and partial braking force at a respective axle considered in the brake force distribution.

8. The braking system as claimed in claim 7, wherein the reference axle a front axle of the motor vehicle.

9. A motor vehicle, comprising a braking system as claimed in claim 7.

* * * * *